(12) United States Patent
Yang et al.

(10) Patent No.: US 11,812,196 B2
(45) Date of Patent: Nov. 7, 2023

(54) CONSTRUCTION SITE SAFETY MONITORING SYSTEM BASED ON COMPUTER VISION

(71) Applicants: Tianjin Chengjian University, Tianjin (CN); Xi'an University of Architecture and Technology, Xi'an (CN)

(72) Inventors: Bin Yang, Tianjin (CN); Pengju Liu, Tianjin (CN); Yihang Liu, Tianjin (CN); Dacheng Jin, Tianjin (CN); Bingan Pan, Tianjin (CN); Pengfei Yang, Tianjin (CN); Angui Li, Tianjin (CN)

(73) Assignees: TIANJIN CHENGJIAN UNIVERSITY, Tianjin (CN); XI'AN UNIVERSITY OF ARCHITECTURE AND TECHNOLOGY, Xi'an (CN)

( * ) Notice: Subject to any disclaimer, the term of this patent is extended or adjusted under 35 U.S.C. 154(b) by 0 days.

(21) Appl. No.: 17/529,762

(22) Filed: Nov. 18, 2021

(65) Prior Publication Data
US 2022/0345667 A1    Oct. 27, 2022

(30) Foreign Application Priority Data
Apr. 26, 2021    (CN) .......................... 202110456106.2

(51) Int. Cl.
| H04N 7/18 | (2006.01) |
| G06Q 50/08 | (2012.01) |
| G06Q 50/26 | (2012.01) |

(52) U.S. Cl.
CPC ............. *H04N 7/181* (2013.01); *G06Q 50/08* (2013.01); *G06Q 50/265* (2013.01)

(58) Field of Classification Search
CPC ....... H04N 7/181; G06Q 50/08; G06Q 50/265
See application file for complete search history.

(56) References Cited

U.S. PATENT DOCUMENTS

2020/0294376 A1*  9/2020  Rao .................. G08B 13/19645

FOREIGN PATENT DOCUMENTS

| CN | 107995462 | * | 5/2018 |
| CN | 112001395 | * | 7/2020 |
| CN | 112631135 | * | 11/2020 |

* cited by examiner

*Primary Examiner* — Daniel T Tekle
(74) *Attorney, Agent, or Firm* — WPAT, P.C

(57) ABSTRACT

A construction site safety monitoring system based on computer vision is provided. It includes a data acquisition system for collecting video information of personnel and operation platforms on construction site in real time; an information processing system for detecting and distinguishing the personnel and the operation platforms in the video information, intercepting personnel feature images and video of tilted operation platform whose personnel facial temperature and inclination angles after calculation are greater than or equal to preset values as a personnel safety incident and a platform safety incident respectively; and a terminal reminder system for receiving information of at least one the personnel safety incident and the platform safety incidents and providing a reminder. It can more accurately capture feature information of personnel and operation platform, analyze and calculate the feature information, realize personnel temperature measurement and detect the safety of operation platform, and has a wider application range.

10 Claims, 3 Drawing Sheets

CONSTRUCTION SITE SAFETY MONITORING SYSTEM BASED ON COMPUTER VISION

FIELD OF THE DISCLOSURE

The disclosure relates to the field of construction site safety monitoring technologies, and more particularly to a construction site safety monitoring system based on computer vision.

BACKGROUND OF THE DISCLOSURE

Heat stress will have a negative impact on human health and working state, resulting in low efficiency of daily activities, especially when violent activities are carried out in outdoor environment, it will increase the possibility of suffering from thermal diseases, such as heat spasm, heat exhaustion and heatstroke. When exposed to high temperature, people will be more seriously affected, and even lead to the damage of main organs, physiological function and sudden death.

Construction workers are builders of beautiful cities, and the work performed by this group is characterized by high labor intensity and long working time. According to the relevant national standards, when the temperature reaches 35° C., the working environment belongs to high-temperature working environment. Research has found that when the living temperature is higher than 35° C. or the working temperature is higher than 32° C., the possibility of harm caused by the thermal environment to human body will be greater. Due to the particularity of the outdoor environment in most workplaces on construction sites, it is inevitable that construction workers often exposed to high temperature during summer work, which leads to a large number of construction workers suffering from heatstroke every year, and in some construction sites, there are often construction safety accidents caused by workers' own safety accidents caused by heatstroke.

In addition to the heatstroke, the collapse of workers' operation platforms (e.g., scaffolds and tower cranes) on the construction site will also cause major safety accidents. When the workers are in a high-temperature working environment, their alertness and work efficiency will be greatly affected, which makes it more difficult for the workers to pay attention to the safety of the operation platform and cannot be prevented in time.

Therefore, if the skin temperature of personnel can be monitored in real time and the thermal state of personnel can be evaluated, the occurrence of heatstroke can be avoided to a great extent. Moreover, if the stability of the operation platform can be monitored in real time, more dangerous situations can be further avoided.

The existing technologies that can detect human skin temperature include infrared temperature measurement and thermal imaging temperature measurement. The typical applications of the infrared temperature measurement are infrared temperature measuring gun and infrared temperature measuring door. The applications of this kind of technology have certain limitations. Its temperature measurement distance and the number of temperature measurement per unit time are limited. The most typical example is the face temperature measurement access control system equipped with this technology, and its detection distance is generally no more than 1 meter. Therefore, this technology is not suitable for open places such as construction sites. For the thermal imaging temperature measurement, although the technology can realize remote temperature measurement and multi person temperature measurement, the technology generally displays the temperature distribution map, which cannot intuitively display the feature information of the personnel department, the cost of the technology is high, and it is unable to analyze the shaking of the operation platform. In order to monitor the safety of the operation platform, special personnel are often assigned to view the camera for real-time monitoring, but the video taken by ordinary cameras cannot directly reflect the slight inclination of the operation platform without processing. For the operation platform, even a slight inclination will lead to huge safety accidents, and the monitoring personnel cannot concentrate on checking the safety of the operation platform for a long time, which has caused great trouble for accurately predicting the safety of the operation platform.

SUMMARY OF THE DISCLOSURE

In order to overcome shortcomings of the prior art, an objective of the disclosure is to provide a construction site safety monitoring system based on computer vision, which can monitor the construction safety of outdoor construction site in real time.

In order to achieve the above-mentioned purpose, the disclosure provides a construction site safety monitoring system based on computer vision, including a data acquisition system, an information processing system and a terminal reminder system.

The data acquisition system is configured to collect a video information of personnel on the construction site and operation platforms in real time and send the video information to the information processing system. The operation platforms include a scaffold and a tower crane.

The information processing system may include an object detector (also referred to as an object detection module), an information calculator (also referred to as an information calculation module), an information catcher (also referred to as an information capture module) and an information transmitter (also referred to as an information transmission module). The object detector is configured to detect and distinguish the personnel and operation platform appeared in the video information to obtain object information, and transmit the object information to the information calculator. The information calculator is configured to calculate personnel facial temperatures and inclination angles of the operation platforms. The information catcher is configured to intercept a feature image of a corresponding personnel whose the personnel facial temperature is greater than or equal to one of preset values and send the feature image to the information transmitter, further intercept a feature video of the operation platform whose the inclination angle is greater than or equal to another of the preset values and send the feature video to the information transmitter. The information transmitter is configured to mark the feature image and the feature video as a personnel safety incident and a platform safety incident respectively, and send information of at least one of the personnel safety incident and the platform safety incident to the terminal reminder system.

The terminal reminder system is configured to receive the information of the at least one of the personnel safety incident and the platform safety incident transmitted by the information processing system and provide a reminder.

In an embodiment, the video acquisition system may include ordinary cameras and an information storing module. The ordinary cameras are configured to capture the construction site to obtain the video information and send the video information to the information storing module. The information storing module is configured to store the video information of the construction site.

In an embodiment, the object detector is configured to use a target algorithm to detect and distinguish the personnel and the operation platforms in the video information in real time to thereby obtain the object information, and transmit the object information to the information calculator.

In an embodiment, the information calculator is specifically configured to enlarge the object information through video enlargement, including to enlarge faces of the personnel and calculate the personnel facial temperatures; and to enlarge videos of the operation platforms and calculate stability of the operation platforms by a matching algorithm.

In an embodiment, the preset values include a 36° C. of personnel facial temperature, a 0.2° of inclination angle of the tower crane of the operation platforms, and a 0.3° of inclination angle of vertical pole of the scaffold.

In an embodiment, the information calculator is specifically configured to transmit a facial feature image and a clothing feature image of the corresponding personnel whose the personnel facial temperature is greater than or equal to one of the preset values, and feature video information of the operation platforms to the information catcher. The information catcher is specifically configured to compare the corresponding personnel with marked personnel obtain a personnel comparison result, intercept a feature video from before to after a tilt of the operation platform to obtain an intercepted feature video, and send the personnel comparison result and the intercepted feature video of the operation platform to the information transmitter.

In an embodiment, the information catcher is specifically configured to: when the corresponding personnel been captured and one of the marked personnel are the same personnel, calculate a maximum time interval for the same personnel appeared in the information catcher, and intercept the feature image of the same personnel and transmits to the information transmitter when the maximum time interval exceeds 15 minutes; and the information transmitter is configured to mark the feature image of the same personnel as the personnel safety incident and sends information of the personnel safety incident to the terminal reminder system. The information catcher is specifically configured to: when the corresponding personnel been captured different from the marked personnel, mark the corresponding personnel.

In an embodiment, the information transmitter is configured to mark the intercepted feature video of the operation platform as the platform safety incident, and send information of the platform safety incident to the terminal reminder system.

In an embodiment, the terminal reminder system may include a voice announcing module and a video and image playing module. The voice announcing module is configured to remind a manager of the at least one of the personnel safety incident and the platform safety incident, and the video and image playing module is configured to play the feature image of the corresponding personnel and video of a tilted one of the operation platforms to the manager.

In an embodiment, the voice announcing module is specifically configured to broadcast "there is a risk of personnel safety incident" when the personnel safety incident occurs, and the video and image playing module is specifically configured to play the feature image of the corresponding personnel for the manager to view when the personnel safety incident occurs. The voice announcing module is specifically configured to broadcast "there is a risk of the platform safety incident" when the platform safety incident occurs, and the video and image playing module is specifically configured to play the video of the tilted operation platform for the manager to view when the platform safety incident occurs.

Compared with the related art, the embodiments of the disclosure may have one or more of the following beneficial effects:

the disclosure provides a construction site safety monitoring system based on computer vision. The system includes the data acquisition system, the information processing system and the terminal reminder system. The hardware equipment used in the data acquisition system is mainly the ordinary cameras, and the cost is much lower than that of the thermal imaging camera used in the thermal imaging technology. The ordinary camera records and detects the status of the construction site in real time. The information processing system calculates the facial temperature of the construction personnel. When the information processing system is detected that facial skin temperature of the construction personnel exceeds the preset values, the terminal reminder system sends a warning, and the information processing system captures information of facial feature of the personnel in real time, so that the manager of the construction site can respond and adjust in time based on this to thereby avoid heatstroke to a large extent. The information processing system of the disclosure can also judge the safety of the operation platforms, solve the problem of the inability to predict the safety of the operation platforms, and give early warning of possible operation accidents in time, thereby avoiding the occurrence of accidents.

Further, because the shaking or tilting incidents of the operation platforms such as the scaffold and the tower crane are not easy to be detected by the naked eye, the construction site safety monitoring system provided by the disclosure can amplify real-time monitored video based on Euler video amplification technology, capture the video of incident promptly and accurately, and prevent the occurrence of safety accidents caused by the operation platforms.

Further, compared with the single temperature measurement function of the existing thermal imaging technology, the construction site safety monitoring system based on computer vision provided by the disclosure can not only realize personnel temperature measurement, but also detect the safety of the operation platforms, and has a wider application range. Compared with the existing infrared temperature measurement technology, the construction site safety monitoring system of the disclosure can more accurately capture feature information of the personnel and the operation platforms, analyze and calculate the captured video, have a longer measurement distance, and can realize multi person measurement at the same time.

DETAILED DESCRIPTION OF EMBODIMENTS

The disclosure will be further described below in combination with the accompanying drawings and illustrated embodiments.

Computer vision refers to the use of cameras and computers instead of human eyes for machine vision such as target recognition, tracking and measurement, and further graphics processing, so that the computer processing can become an image more suitable for human eyes to observe or transmit to instruments for detection. The computer vision is an interdisciplinary subject developed on the basis of computer, mathematics, engineering, psychology and other disciplines. Common applications of the computer vision include image classification, object monitoring, target tracking and so on. The main purpose of the disclosure is to convert video or image information into information that can be directly fed back to personnel, using some algorithms and technologies of the computer vision, such as target detection and classification, matching algorithm, etc.

The disclosure provides a construction site safety monitoring system based on computer vision, which uses the ordinary camera to collect the video information of the construction site in summer, analyzes and calculates the video through the computer vision, and obtains the temperature of outdoor construction personnel and the relative position change of operation platform of the construction personnel in summer. The safety of the construction site is judged by changes of the temperature and the relative position. When dangerous information appears, relevant key information is intercepted and sent to the terminal reminder system to remind the manager of the construction site in time, and the construction manager will make timely adjustment to the construction site according to incident reminder, so as to avoid construction safety accidents such as worker heatstroke and operation platform collapse in advance.

Figure 1:
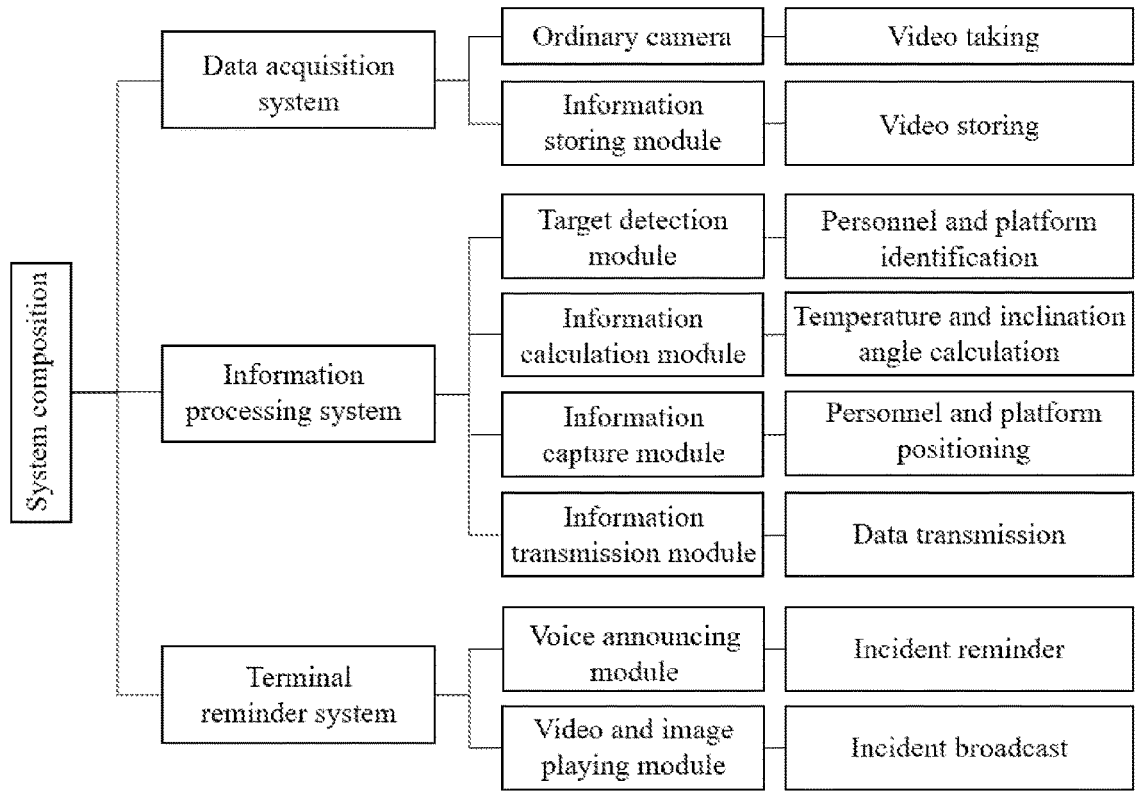
FIG. 1 is a schematic diagram of a composition of a construction site safety monitoring system of the disclosure.
Figure 2:
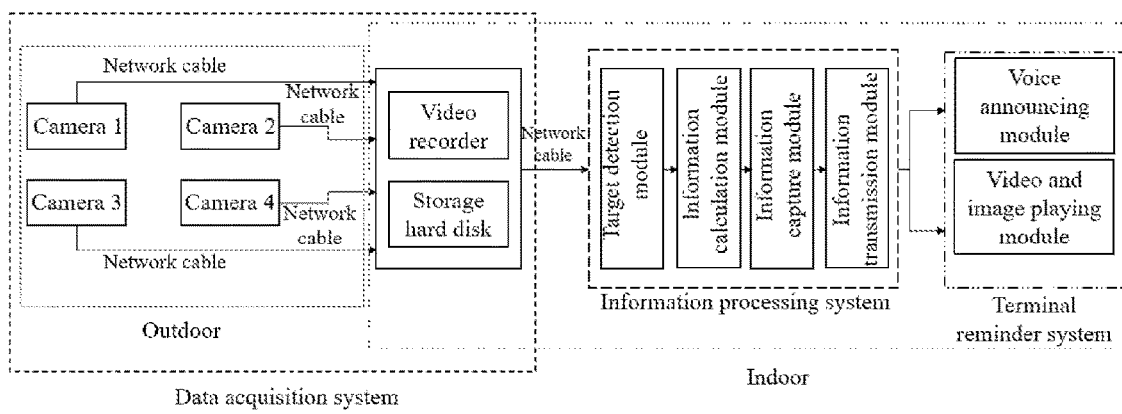
FIG. 2 is a schematic diagram of connection relations of a construction site safety monitoring system of the disclosure.

The construction site safety monitoring system based on computer vision provided by the disclosure may include a video data acquisition system, an information processing system and a terminal reminder system. The information processing system and the terminal reminder system are set indoors. The specific modules and functions of each system are shown in FIG. 1, and the connection relations between modules is shown in FIG. 2.

The video acquisition system may mainly include ordinary cameras and an information storing module. In order to facilitate data acquisition, four ordinary cameras are placed at four corners of the periphery of the construction site. Without affecting the normal construction, viewing angles of the ordinary cameras can be adjusted according to specific situation of the construction site. Multiple cameras are connected to the information storing module through network cables, information of the captured video is transmitted to the information storing module through the network cables for storage.

The information storing module is set indoors, and the information storing module is connected to the information processing system through network cable for transmitting video information to the information processing system.

In an illustrated embodiment, the information storing module is a video recorder with a built-in storage hard disk, which stores the video information captured by the four ordinary cameras.

In an illustrated embodiment, the video recorder adopts Hikvision DS-7104N-SN/C video recorder; and the storage hard disk adopts Seagate ST3000DM008 hard disk.

The information processing system is based on an embedded development board, and the model of the development board is NVIDIAJETSONNANO. The information processing system may include an object detector (also referred to as an object detection module), an information calculator (also referred to as an information calculation module), an information catcher (also referred to as an information capture module) and an information transmitter (also referred to as an information transmission module) successively connected in form of integrated circuits. It can be understood that the object detection module (object detector) includes a processor and a memory connected to the processor, and the memory includes software modules, executable by the processor; the information calculation module (information calculator) includes a processor and a memory connected to the processor, and the memory includes software modules, executable by the processor; the information capture module (information catcher) includes a processor and a memory connected to the processor, and the memory includes software modules, executable by the processor; and the information transmission module (information transmitter) includes a processor and a memory connected to the processor, and the memory includes software modules, executable by the processor. In short, the object detector, the information calculator, the information catcher and the information transmitter may be implemented/embodied by at least one processor and at least one memory which is coupled to the at least one processor and stores programs executable by the at least one processor.

The information storing module is connected to the object detector through the network cable, and sends the stored video information to the object detector. The object detector is configured to receive the video information, use a target algorithm to detect and distinguish the construction workers, the scaffold and the tower crane of the operation platforms in the video information in real time, and transmit the distinguished object information to the information calculator.

The information calculator is configured to receive the object information and enlarge the object information by using video enlargement technology, including:

1. to enlarge faces of the personnel and calculate the personnel facial temperatures; and 2. to enlarge videos of the operation platforms and calculate stability of the operation platforms by a matching algorithm, that is, inclination angles of the scaffold and the tower crane.

The information calculator is specifically configured to transmit information of the personnel and the video of the operation platform whose the personnel facial temperature and the inclination angles of the operation platforms exceed the preset values to the information catcher, and:

1. the information catcher is specifically configured to capture facial feature and clothing feature information of the personnel, and compare the personnel feature information with the feature information of the marked personnel. When the personnel been captured different from the marked personnel, the information catcher is specifically configured to number and mark the corresponding personnel been captured according to the existing numbering sequence. When the corresponding personnel been captured and one of the marked personnel are the same personnel, the information catcher is specifically configured to calculate a maximum time interval for the same personnel appeared in the information catcher, and intercept the feature image of the same personnel and transmit to the information transmitter when the maximum time interval exceeds 15 minutes;

2. the information catcher is specifically configured to number and mark the operation platform according to the position information of the operation platform, intercept feature video 5 seconds (s) from before to after the tilt of the operation platform to obtain an intercepted feature video, and transmit the number information and the intercepted feature video to the information transmitter; and 3. the information transmitter is specifically configured to classify the information transmitted by the information catcher, marks the personnel feature image as a personnel safety incident, marks the feature video as a platform safety incident, and transmit information of the personnel safety incident and/or the platform safety incident to the terminal reminder system.

In an illustrated embodiment, the preset values include a 36° C. of personnel facial temperature, a 0.2° of inclination angle of the tower crane of the operation platforms, and a 0.3° of inclination angle of vertical pole of the scaffold.

The information transmitter is respectively connected to the voice announcing module and the video and image playing module of the terminal reminder system through the network cable. The voice announcing module and the video and image playing module are set indoors.

In an illustrated embodiment, the voice announcing module adopts an ordinary announcer equipped with a certain program, and the video and image playing module is a liquid crystal display, which receives and plays the video and image information transmitted by the information transmitter through the network cable.

The terminal reminder system is specifically configured to receive the information of the personnel safety incident and/or the platform safety incident transmitted by the information transmitter, and reminds the manager of safety problems on the construction site, specifically:

1. when the personnel safety incident occurs, the voice announcing module broadcasts "there is a risk of personnel safety incident", and the video and image playing module plays the feature image of the personnel for the manager to view;

2. when the platform safety incident occurs, the voice announcing module broadcasts "there is a risk of platform safety incident", and the video and image playing module plays the video of the tilted operation platform for the manager to view; and 3. when the personnel safety incident and the platform safety incident occur at the same time, due to the difference of personnel's thermal tolerance, not everyone's facial temperature reaches 36° C. for 15 minutes, while the platform safety incident can't wait, and once the platform safety incident occurs, it may cause greater accidents. Moreover, the probability of the personnel safety incident and the platform safety incident occurring at the same time is relatively small, the video of the tilted operation platform will be played first as a priority when the personnel safety incident and the platform safety incident occur at the same time.

In an illustrated embodiment, a video player (also referred to as a video playing module) and an image player (also referred to as an image playing module) can also be set respectively. When the personnel safety incident and the platform safety incident occur at the same time, the video of the tilted operation platform and the personnel feature image can be played at the same time.

The manager on the construction site shall make timely adjustments to the construction site according to the reminder of the terminal reminder system, so as to avoid construction safety accidents such as the heatstroke of the construction personnel and the operation platform collapse in advance. In the illustrated embodiment, the terminal reminder system may include: at least one processor, and at least one memory which is coupled to the at least one processor and stores programs executable by the at least one processor.

Figure 5:
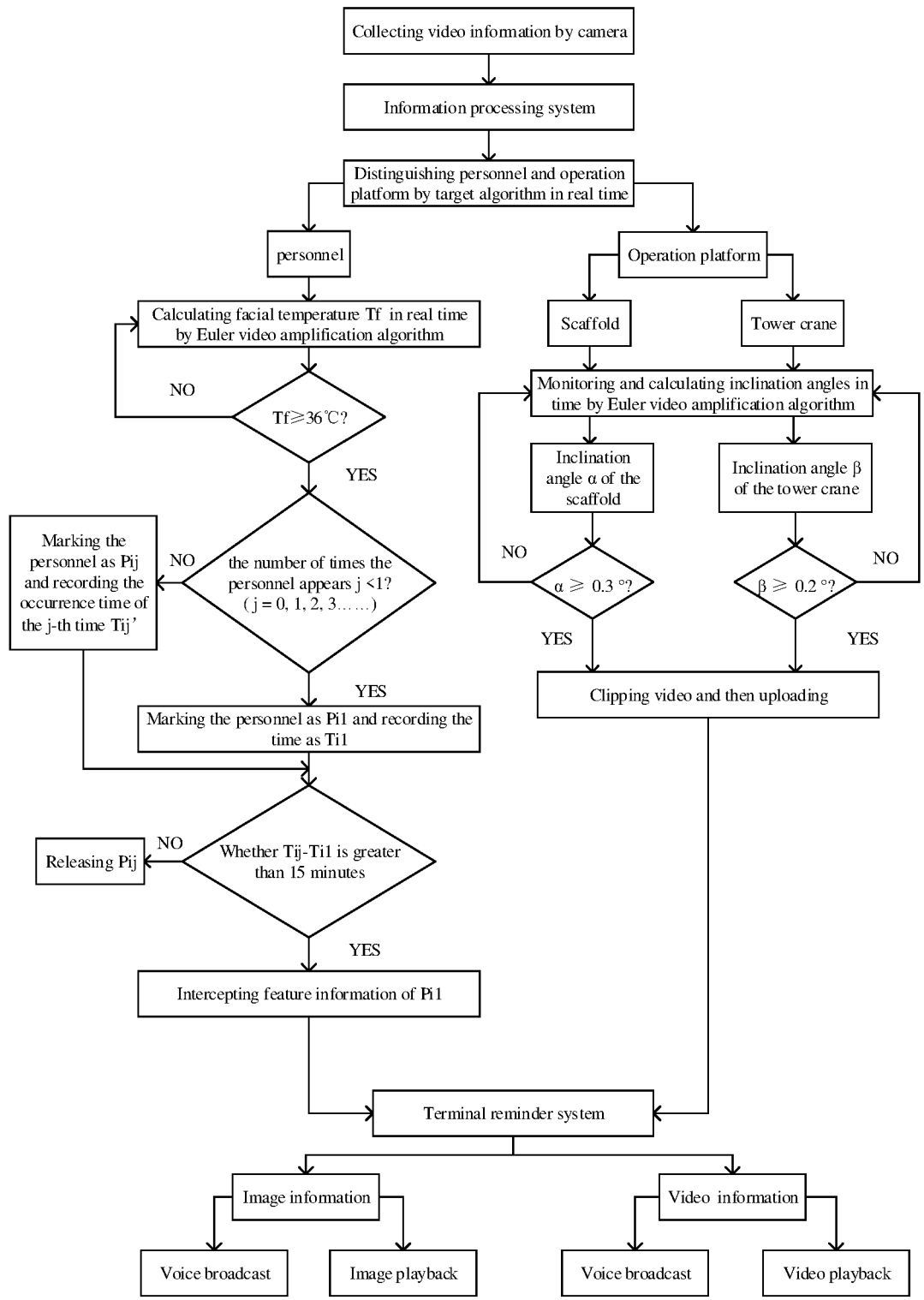
FIG. 5 a flow chart of a construction site safety monitoring system of the disclosure.

As shown in FIG. 5, the following describes the process and specific implementation mode of the disclosure by taking the detection of heatstroke and construction safety on the construction site as an example:

1. The ordinary cameras are erected on the construction site to record the video information on the construction site in real time, and the information storing module stores the video information.

2. The information storing module transmits the collected video information to the object detector. The object detector uses the target algorithm to detect and distinguish the construction workers, the scaffold and the tower crane of the operation platforms in the video information in real time. The object detector transmits the detected object information to the information calculator.

3. The information calculator uses the Euler video amplification technology to identify the exposed skin temperature of construction workers. The Euler video amplification algorithm can obtain the skin color saturation of human body by Fourier transform. According to the linear relationship between the skin color saturation and the skin temperature, the facial skin temperature $T_f$ of human body can be further obtained. When $T_f \geq 36°$ C., the information catcher intercepts the facial feature image and clothing feature image of the worker.

Specifically, the information catcher marks personnel with $T_f \geq 36°$ C. as $P_{i1}$, where P represents the personnel, first subscript i represents personnel number, i=1, 2, 3 . . . , second subscript 1 represents that the personnel appears for the first time; and the information catcher records time $T_{i1}$ of the personnel marked $P_{i1}$, where i represents the personnel number, first subscript i=1, 2, 3 . . . , second subscript 1 represents that the personnel appears for the first time. The information calculator continuously calculates the personnel facial temperature. When the facial temperature of the other personnel is detected to be $\geq 36°$ C., it is transmitted to the information catcher for comparison with the personnel marked $P_{i1}$. When the other personnel different from the marked personnel, the other personnel is marked according to the existing number. When the other personnel and the marked personnel are the same personnel, a time $T_{ij}'$ when the personnel reappears is recorded, where i represents the personnel number, i=1, 2, 3 . . . , j represents the number of times the person appears, j=0, 1, 2, 3 . . . ; e.g., $T_{12}'$ represents a time when the person with number 1 appears in the information catcher for the second time. When $T_{ij}'-T_{i1}$ is greater than 15 minutes, the information catcher sends information of the facial feature and clothing feature of the same personnel to the information transmitter. When $T_{ij}'-T_{i1}$ is less than 15 minutes, it indicates that the corresponding personnel is temporarily safe, releases $T_{ij}'$, and the information catcher captures a next time when the personnel's facial temperature $\geq 36°$ C.

Figure 3:
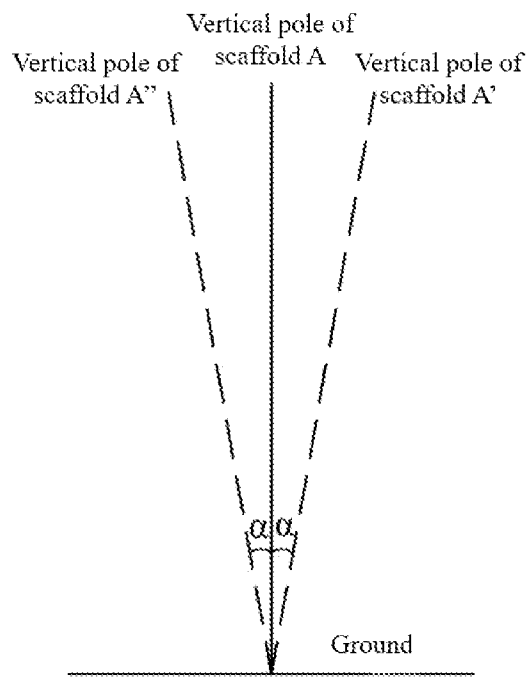
FIG. 3 is a schematic diagram of an inclination angle of a scaffold.

The information calculator uses the Euler video amplification algorithm to amplify the video of the vertical pole at the edge of the scaffold in real time. Taking the vertical pole as a benchmark, the matching algorithm is used to calculate the inclination or shaking angle α of the vertical pole. When α reaches 0.3°, as shown in FIG. 3, the scaffold is numbered and marked, and the video before and after shaking or tilting is intercepted. The video duration is 5 seconds, and the video is sent to the information transmitter.

Figure 4:
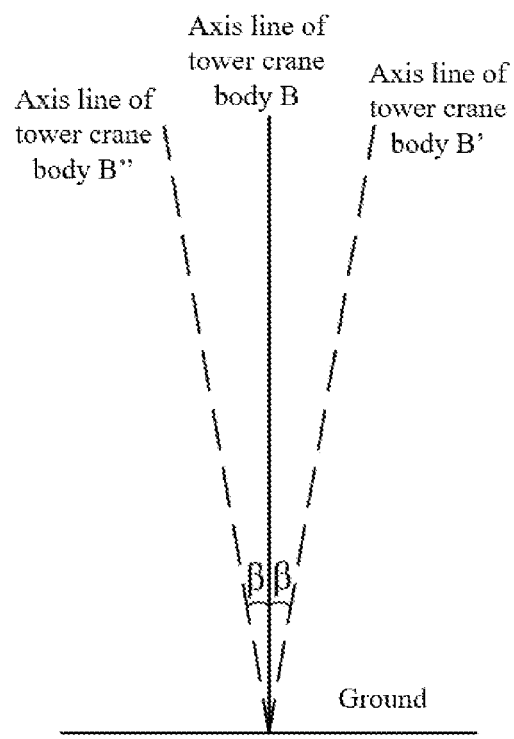
FIG. 4 is a schematic diagram of an inclination angle of a tower crane.

The information calculator uses the Euler video amplification algorithm to amplify the video of the tower crane in real time. Taking an axis line of the tower crane as a benchmark, the matching algorithm is used to calculate the inclination or shaking angle β of the axis line. When β reaches 0.2°, as shown in FIG. 4, the tower crane is numbered and marked, and the video when the tower crane shakes or tilts left and right is intercepted. The video duration is 5 seconds, and send the video to the information transmitter.

In an illustrated embodiment, the target algorithm adopts CascadeR-CNN algorithm, and the matching algorithm adopts SIFT algorithm.

4. The information transmitter classifies the information transmitted by the information catcher, marks the information the personnel feature image as the personnel safety incident, marks the video information as the platform safety incident, and transmits the information of the personnel safety incident and/or the platform safety incident to the terminal reminder system.

5. The terminal reminder system receives the incident information transmitted by the information transmitter. When the personnel safety incident occurs, the voice announcing module broadcasts "there is a risk of personnel safety incident", and the video and image playing module plays the feature image of the personnel for the manager to view; when the platform safety incident occurs, the voice announcing module broadcasts "there is a risk of platform safety incident", and the video and image playing module plays the video of the tilted operation platform for the manager to view.

What is claimed is:

1. A construction site safety monitoring system based on computer vision, comprising:
    a data acquisition system, an information processing system and a terminal reminder system;
    wherein the data acquisition system is configured to collect a video information of personnel on the construction site and operation platforms in real time and send the video information to the information processing system, and the operation platforms comprise a scaffold and a tower crane;
    wherein the information processing system comprises an object detector, an information calculator, an information catcher and an information transmitter;
    the object detector is configured to detect and distinguish the personnel and the operation platforms appeared in the video information to obtain object information, and transmit the object information to the information calculator;
    the information calculator is configured to calculate personnel facial temperatures and inclination angles of the operation platforms;
    the information catcher is configured to intercept a feature image of a corresponding personnel whose the personnel facial temperature is greater than or equal to one of preset values and send the feature image to the information transmitter, and further intercept a feature video of the operation platform whose the inclination angle is greater than or equal to another of the preset values and send the feature video to the information transmitter;
    the information transmitter is configured to mark the feature image and the feature video as a personnel safety incident and a platform safety incident respectively, and send information of at least one of the personnel safety incident and the platform safety incident to the terminal reminder system;
    wherein the terminal reminder system is configured to receive the information of the at least one of the personnel safety incident and the platform safety incident transmitted by the information processing system and provide a reminder;
    wherein the information catcher is specifically configured to:
        compare the corresponding personnel with marked personnel;
        calculate a maximum time interval for the same personnel when the corresponding personnel and one of the marked personnel are the same personnel, and intercept the feature image of the same personnel and transmit the feature image to the information transmitter when the maximum time interval exceeds 15 minutes, thereby to enable the information transmitter to mark the feature image as the personnel safety incident; and
        mark the corresponding personnel with a personnel number different from that of the marked personnel when the corresponding personnel is different from the marked personnel;
    wherein the terminal reminder system comprises a voice announcing module, and a video and image playing module; the voice announcing module is configured to remind a manager of the at least one the personnel safety incident and the platform safety incident, and the video and image playing module is configured to play the feature image of the corresponding personnel and video of a tilted one of the operation platforms to the manager;
    wherein the voice announcing module is specifically configured to broadcast "there is a risk of personnel safety incident" when the personnel safety incident occurs, and the video and image playing module is specifically configured to play the feature image of the corresponding personnel for the manager to view when the personnel safety incident occurs;
    wherein the voice announcing module is specifically configured to broadcast "there is a risk of platform safety incident" when the platform safety incident occurs, and the video and image playing module is specifically configured to play the video of the tilted operation platform for the manager to view when the platform safety incident occurs;
    wherein when the personnel safety incident and the platform safety incident occur at the same time, the video of the tilted operation platform for the manager is played as a priority.

2. The construction site safety monitoring system according to claim 1, wherein the data acquisition system comprises cameras and an information storing module; the cameras are configured to capture the construction site to thereby obtain the video information and send the video information to the information storing module; and the information storing module is configured to store the video information of the construction site.

3. The construction site safety monitoring system according to claim 1, wherein the object detector is configured to use a target algorithm to detect and distinguish the personnel and the operation platforms in the video information in real time to thereby obtain the object information, and transmit the object information to the information calculator.

4. The construction site safety monitoring system according to claim 1, wherein the information calculator is specifically configured to enlarge the object information through video enlargement, including to enlarge faces of the personnel and calculate the personnel facial temperatures; and to enlarge videos of the operation platforms and calculate stability of the operation platforms by a matching algorithm.

5. The construction site safety monitoring system according to claim 1, wherein the preset values comprise a 36° C. of personnel facial temperature, a 0.2° of inclination angle of the tower crane of the operation platforms, and a 0.3° of inclination angle of vertical pole of the scaffold.

6. The construction site safety monitoring system according to claim 1, wherein the information calculator is specifically configured to transmit a facial feature image and a clothing feature image of the corresponding personnel whose the personnel facial temperature is greater than or equal to the one of the preset values, and feature video information of the operation platforms to the information catcher; and wherein the information catcher is specifically configured to intercept a feature video from before to after a tilt of the operation platform to obtain an intercepted feature video, and send the intercepted feature video of the operation platform to the information transmitter.

7. The construction site safety monitoring system according to claim 6, wherein the information transmitter is configured to mark the intercepted feature video of the operation platform as the platform safety incident, and send information of the platform safety incident to the terminal reminder system.

8. The construction site safety monitoring system according to claim 1, wherein the information processing system and the terminal reminder system are set indoors.

9. The construction site safety monitoring system according to claim 2, wherein a number of the cameras is four, and the cameras are placed at four corners of a periphery of the construction site.

10. The construction site safety monitoring system according to claim 1, wherein reminders of the terminal reminder system are capable of help the manager on the construction site to make adjustments to avoid construction safety accidents including heatstroke of the personnel and collapse of the operation platforms in advance.

* * * * *